(12) United States Patent  (10) Patent No.: US 8,433,626 B1
McDaniel et al.  (45) Date of Patent: Apr. 30, 2013

(54) METHOD, MEDIUM, AND SYSTEM FOR FLIPPING A LIST

(75) Inventors: Michael D. McDaniel, Kirkalnd, WA (US); Jeffrey T. Brownell, Beaverton, OR (US); Homer G. Morgan, III, Seattle, WA (US); Brent Russell Smith, Redmond, WA (US); Wesley M. Turner, Seattle, WA (US); Michael C. Day, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 107 days.

(21) Appl. No.: 12/859,311

(22) Filed: Aug. 19, 2010

(51) Int. Cl.
*G06Q 30/00* (2006.01)

(52) U.S. Cl.
USPC ........................................... 705/27.1

(58) Field of Classification Search ............ 705/26.1, 705/27.1, 27.2
See application file for complete search history.

(56) References Cited

U.S. PATENT DOCUMENTS

| | | | |
|---|---|---|---|
| 6,629,079 B1* | 9/2003 | Spiegel et al. | 705/26.7 |
| 6,873,968 B2* | 3/2005 | Ehrlich et al. | 705/80 |
| 7,188,081 B1* | 3/2007 | Shah | 705/26.8 |
| 7,318,043 B1* | 1/2008 | Silver et al. | 705/26.81 |
| 2001/0021914 A1* | 9/2001 | Jacobi et al. | 705/8 |
| 2003/0083961 A1* | 5/2003 | Bezos et al. | 705/27 |
| 2003/0120505 A1* | 6/2003 | Spiegel | 705/1 |
| 2004/0254855 A1* | 12/2004 | Shah | 705/26 |
| 2005/0071251 A1* | 3/2005 | Linden et al. | 705/26 |
| 2006/0122895 A1* | 6/2006 | Abraham et al. | 705/26 |
| 2006/0195369 A1* | 8/2006 | Webb et al. | 705/27 |
| 2007/0271149 A1* | 11/2007 | Siegel et al. | 705/26 |
| 2009/0299875 A1* | 12/2009 | Zhu et al. | 705/27 |

OTHER PUBLICATIONS

Jul. 13, 2009—http://jonraasch.com/blog/quickflip-2-jquery-plugin.*

* cited by examiner

*Primary Examiner* — Matthew Zimmerman
(74) *Attorney, Agent, or Firm* — Thomas|Horstemeyer, LLP

(57) ABSTRACT

Disclosed is a system for transitioning between views in a network page. An application that is executed in at least one computing device encodes a network page for rendering in a client, the network page including a region, and the region being configured for the rendering of at least two views. The network page is encoded to depict a transition between the two views. A first one of the views depicts at least one mechanism to add a depicted item in the network page to a list, and a second one of the views depicts at least a portion of the list. Once encoded, the network page is sent to the client.

28 Claims, 6 Drawing Sheets

METHOD, MEDIUM, AND SYSTEM FOR FLIPPING A LIST

BACKGROUND

When a customer of an online retailer adds a product to a virtual shopping cart on a network site, the customer is often presented with a network page such as a web page showing the contents of the virtual shopping cart. Such a network page may display, for example, quantities of each product in the virtual shopping cart, price subtotals, shipping quotations, and other information related to the virtual shopping cart. Accordingly, the customer may decide whether to proceed with placing an order for the products listed in the virtual shopping cart. However, some customers may not wish to view the virtual shopping cart at this time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to the use of a transition between views depicted in a region to provide confirmation for users that modify lists of items. For example, a list such as a virtual grocery cart may be depicted in a region in a network page such as a web page. Such a region may be transitioned from one view that depicts various data and provides a user with the chance to add items to the virtual grocery cart, to a second view that depicts the virtual grocery cart. If a user indicates that they wish to add an item to the virtual grocery cart, for example, rather than directing the user to a different network page, the region is transitioned to a second view that depicts at least a portion of the virtual grocery cart. In one embodiment, the transition is done in such a manner that relays a sense of permanence of the first view. In the following discussion, a general description of the system and its components is provided, followed by a discussion of the operation of the same.

Figure 1:
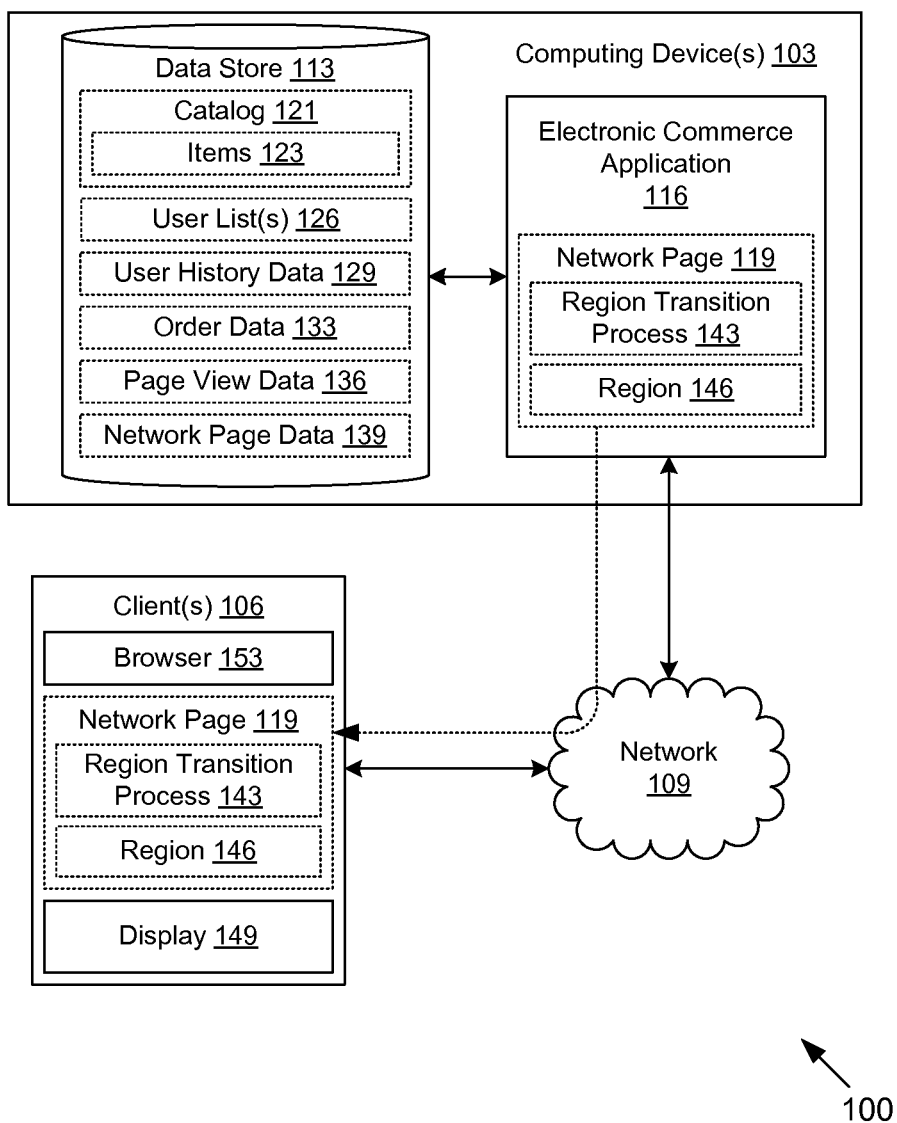
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce application 116 and other applications, services, processes, systems, engines, or functionality not discussed in detail herein. The electronic commerce application 116 is executed to facilitate the online purchase of items 123 over the network 109. The electronic commerce application 116 also performs various backend functions associated with the online presence of a merchant in order to facilitate the online purchase of items 123 as will be described. For example, the electronic commerce application 116 generates network pages 119 such as web pages or other types of network content that are provided to clients 106 for the purposes of selecting items 123 for purchase, rental, download, lease, or other form of consumption.

The data stored in the data store 113 includes, for example, a catalog 121 of items 123, user lists 126, user history data 129, order data 133, page view data 136, network page data 139, and potentially other data. The items 123 include data relating to items 123 ordered, for example, through the electronic commerce application 116. As used herein, the term "item" refers to any product, good, service, download, media feature, and/or any other item 123 that may be offered for sale, rental, or download by an online retailer. The data describing the items 123 may include, for example, titles, descriptions, quantities, prices, weights, reviews, ratings, related items 123, relevant keywords, and/or any other data that may be used to describe the items 123.

Each of the user lists 126 comprises, for example, a list of items 123 that has been created by users. To this end, each user list 126 may include references to various items 123 selected by or for a user, quantities of the respective items 123, options and other attributes associated with the respective items 123, and/or other information. In one embodiment, there may be multiple user lists 126 of items 123 for each user. Such user lists 126 may include listings of items 123 in the form of virtual shopping carts, shopping lists, purchase lists, gift registries, wish lists, orders for items 123, and/or any other listings of items 123. The user history data 129 may describe previous selections of items 123 by respective users. Such item 123 selections may include orders of the respective items 123, views of network pages 119 associated with the items 123, and/or any other type of selection of an item 123 that can be correlated to a user.

The order data 133 describes past orders that have been placed by customers of the network site facilitated by the electronic commerce application 116. The page view data 136 includes data describing previous views of network pages 119 by various users. The page view data 136 may be determined, for example, through logs of a network page server, the electronic commerce application 116, and/or other applications that may track network page 119 views. The network page data 139 includes data that may be used in generating the network pages 119 that are sent to the clients 106. To this end, the network page data 139 may include templates, images, audio, video, animations, content, and/or any other data that may be used by the electronic commerce application 116 in generating network pages 119.

In addition, the electronic commerce application 116 generates network pages 119 of a network site as mentioned above that are sent to clients 106 in response to requests such as HTTP request from the clients 106. In generating such network pages 119, the electronic commerce application 116 encodes the network pages 119 and sends them to the clients 106 in response to client 106 requests. While encoding the network pages 119, according to one embodiment, the electronic commerce application 116 may associate a region transition process 143 that is associated with or included in one or more network pages 119 sent to respective clients 106. According to one embodiment, the region transition process 143 is employed to perform a transition in a region 146 of the network page 119 as will be described.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 106 may include a display 149. The display 149 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 153 and/or other applications. The browser 153 may be executed in a client 106, for example, to access and render network pages 119, such as web pages, or other network content served up by the computing device 103 and/or other servers. In rendering a network page 119, the browser 153 generates the network page 119 on the display 149 device. The rendered network page 119 includes a region 146 as will be described. The client 106 may be configured to execute applications beyond browser 153 such as, for example, email applications, instant message applications, and/or other applications.

The region transition process 143 is downloaded from the electronic commerce application 116 to the client 106 as part of the network page 119. The region transition process 143 is executed by the browser 153 in order to transition the region 146 rendered on the display 149 between a respective two of a plurality of views as will be described. The region transition process 143 may include any type of client-side code such as, for example, JavaScript, cascading style sheets, dynamic hypertext markup language (DHTML), Java, ActiveX, and/or any other type of code that may be used in controlling the rendering of the region 146 with dynamic content. In alternative embodiments, the rendering of the region 146 may be controlled by the electronic commerce application 116.

Next, a general description of the operation of the various components of the networked environment 100 is provided. To begin, a user browses for items 123 on a network site served up by the electronic commerce application 116 in order to potentially purchase items 123 from the merchant that operates the network site. The user may request one or more network pages 119 from the electronic commerce application 116. In response, the electronic commerce application 116 encodes the network pages 119 to be rendered in the requesting client 106.

In one example, the network pages 119 encoded by the electronic commerce application 116 may comprise a detail network page 119 that describes one or more items 123 in detail, a category network page 119 describing items 123 associated with a category, a search result network page 119 providing a list of items 123 resulting from a search query, and/or any other type of network page 119 that features one or more items 123. In one embodiment, the network page 119 includes the region transition process 143 and the region 146. One or more views may be rendered in the region 146 as will be described. By virtue of the fact that the network page 119 includes the region transition process 143, the network page 119 is encoded to depict a transition between two of the views that are depicted in the region 146 as will be described. Once the network page 119 is encoded, the electronic commerce application 116 sends the same to the requesting client 106.

In one embodiment, the electronic commerce application 116 maintains user lists 126 associated with the user as mentioned above. According to one embodiment, the user may modify one or more lists of items 123 by way of a component rendered in the network page 119 by the browser 153.

As a non-limiting example, the network page 119 may describe an item 123 and include a component adjacent to the item 123 for requesting that the item 123 be added to a virtual shopping cart, wish list, an existing order for items 123, or some other list of items 123. Such a component may be any type of user interface component that may be included within a network page 119 such as, for example, buttons, checkboxes, hyperlinks, selectable images, and/or any other type of component. In one embodiment, the component is located in a first view in the region 146.

When the user manipulates such a component, a request may be sent over the network 109 to the electronic commerce application 116 to add the respective item 123 displayed to a specified one of the user lists 126. Following the request, the electronic commerce application 116 may return data back to the client 106 including a confirmation as to whether the item 123 was successfully added to the respective user list 126.

According to one embodiment, upon a manipulation of the component mentioned above to add an item 123 to a respective user list 126, the region transition process 143 transitions the region 146 rendered on the display 149 from a first view to a second view. The second view displays the updated user list 126 with the additional item 123. Either a portion of the updated user list 126 may be displayed, or the updated user list 126 may be displayed in its entirety.

The content making up the second view may or may not be encoded as part of the network page 119 sent to the client 106. Specifically, in one embodiment, either part or all of the content making up the second view may be included in the network page 119 before it is sent to the client 106. Alternatively, a request may be sent to the electronic commerce application 116 for the content that makes up the second view upon an occurrence of the transition between the first and second views.

In one embodiment, the transition of the region 146 from a first view to a second view is performed in a manner to relay a sense of permanence to the first one of the views, even though the first one of the views is replaced entirely by the second one of the views. For example, the transition between views may comprise an animated flipping of the region 146. This approach relays a sense of permanence as it gives one the impression that the first view actually exists on the other side of the second view after the animated flip. Also, other approaches may be employed for the transition that promotes a sense of permanence of a previous view.

The various views depicted in the region 146 may include other information other than the components and user lists 126 mentioned above as will be described with reference to later Figures.

It may be the case that the addition or other modification to a given user list 126 may not be successful. As a non-limiting example, a user may request that a particular item 123 be added to a user list 126. However, the electronic commerce application 116 may determine that the particular item 123 is already present within the user list 126. In such a case, the electronic commerce application 116 may activate code within the network page 119 for rendering a preliminary display region (not shown) superimposed as a layer on the network page 119. The preliminary display region may be configured to obtain a user confirmation whether to proceed with adding the particular item 123 to the user list 126. In other embodiments, the region transition process 143 may be configured to update elements within the network page 119, play a sound, activate a dialog box, and/or take some other action to notify the user that the attempted addition or other modification of a user list 126 was unsuccessful.

In addition, in the following discussion, reference may be made to various components that appear in a given network page 119 that may be manipulated by users to perform desired actions. According to one embodiment, such components may comprise, for example, buttons, links, check boxes, toggles, or any other appropriate component as can be appreciated.

Figure 2:
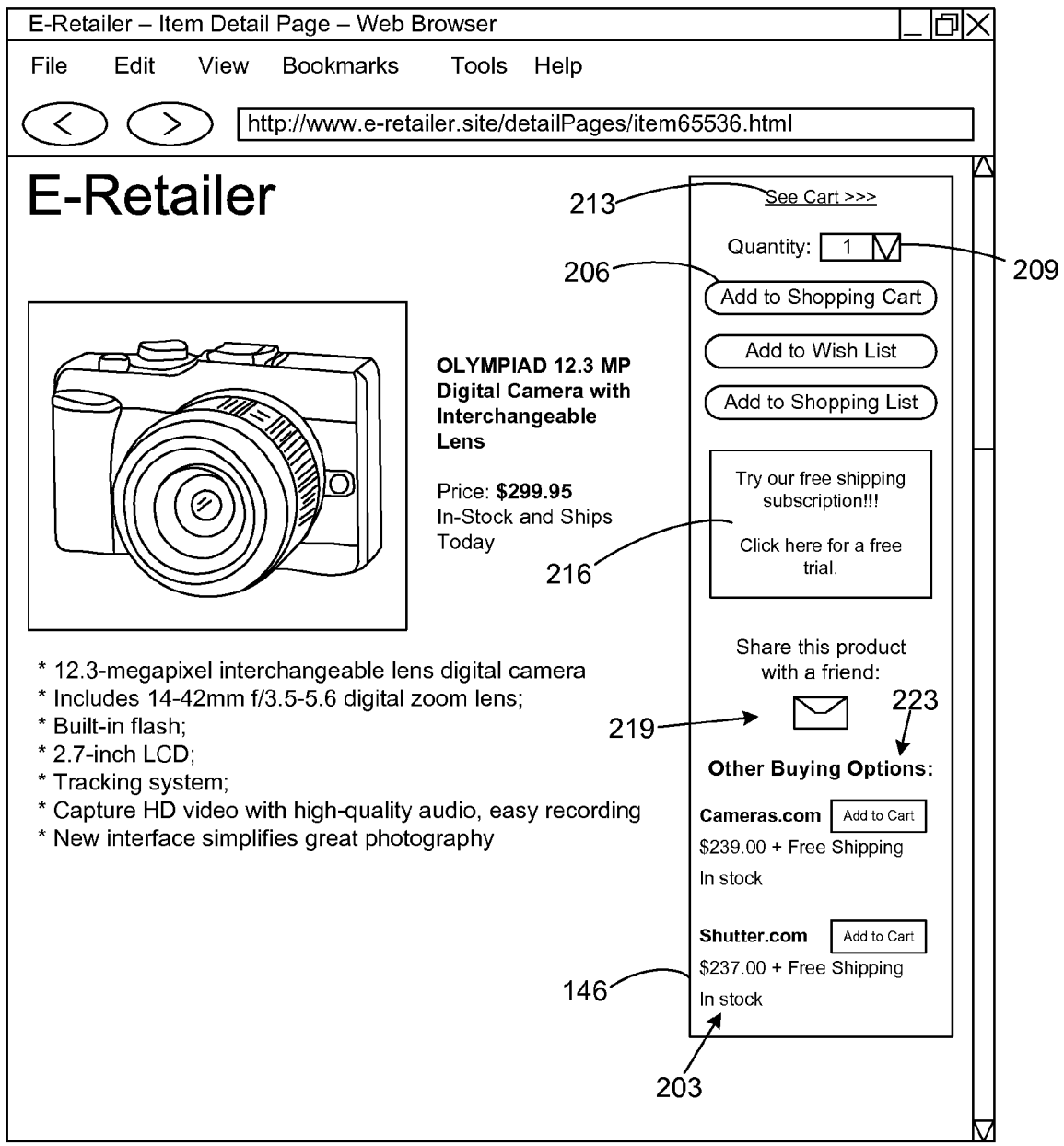
FIGS. 2-4 are drawings of examples of a network page in various states rendered in a client in the networked environment of FIG. 1 according to various embodiments of the present disclosure.

Referring next to FIG. 2, shown is one example of a network page 119 rendered by the browser 153 (FIG. 1) executed in a client 106 (FIG. 1) according to an embodiment of the present disclosure. The network page 119 displayed in FIG. 2 is an example of a detail network page about an item 123 (FIG. 1) such as, for example, a camera. Also, the network page 119 includes the region 146. Depicted in the region 146 is a first view 203. The first view 203 includes an add component 206 for adding the item 123 to a user list 126 (FIG. 1) comprising a virtual shopping cart associated with the user. It is understood that other types of user lists 126 may be modified in other embodiments.

The first view 203 also includes a quantity control 209 for specifying a particular quantity of the item 123 to be included in the virtual shopping cart. This allows a user to add desired quantities of an item 123 depicted in a network page 119 to a given user list 126 such as a virtual shopping cart.

In one embodiment, the network page 119 may optionally include a list view component 213 (e.g., "See Cart" link) to enable the user to view the current contents of the user list 126 such as the virtual shopping cart. If a user manipulates the list view component 213, then the region transition process 143 (FIG. 1) proceeds to implement a transition of the first view 203 depicted to a second view as will be described. In addition, the first view 203 depicted in the region 146 may also include other information such as, for example, advertisements 216, email sharing mechanisms 219, buying options 223, and other types of information.

Figure 3:
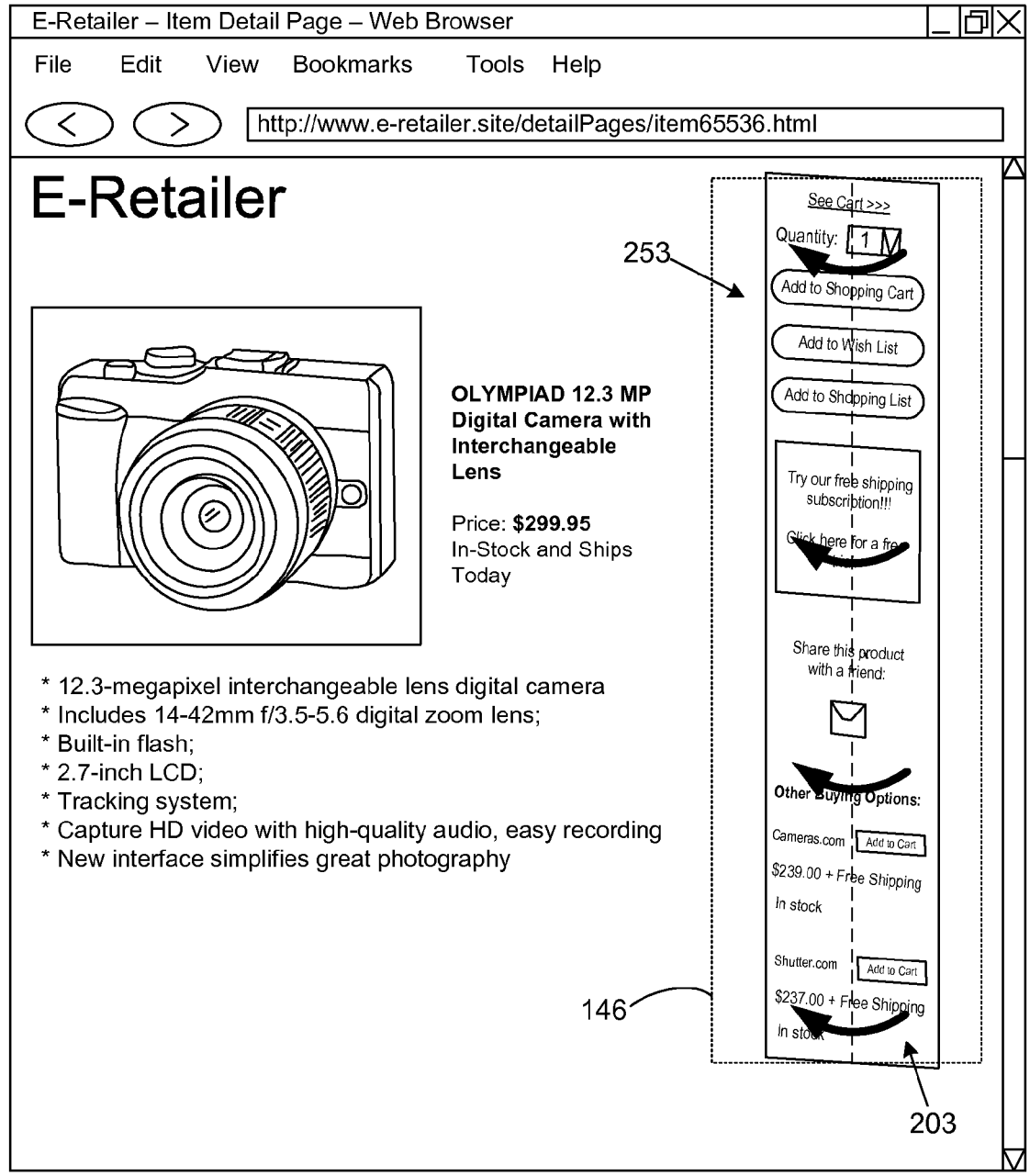

Referring next to FIG. 3, shown is another depiction of the network page 119 as rendered by the browser 153 (FIG. 1) executed in a client 106 (FIG. 1) according to an embodiment of the present disclosure. The network page 119 includes the region 146 in which the transition 253 between the first view 203 within the region 146 and a second view (not shown) in the region 146 is depicted. As shown, the transition 253 in the region 146 is implemented by an animated flip or rotation of the existing first view 203 located in the region 146. As mentioned above, such a transition 253 relays a sense of permanence of the first view 203 since it leaves the user with the impression that the first view 203 exists behind the resulting second view (not shown) that is depicted after the transition 253. While the rotation of the region 146 during the transition 253 is depicted around an axis that is oriented in a vertical direction, it is understood that any axis of rotation employed may be oriented in any direction. Further, the transition 253 may involve some other depiction of flipping that does not depict a rotation of the region 146 as can be appreciated.

Figure 4:
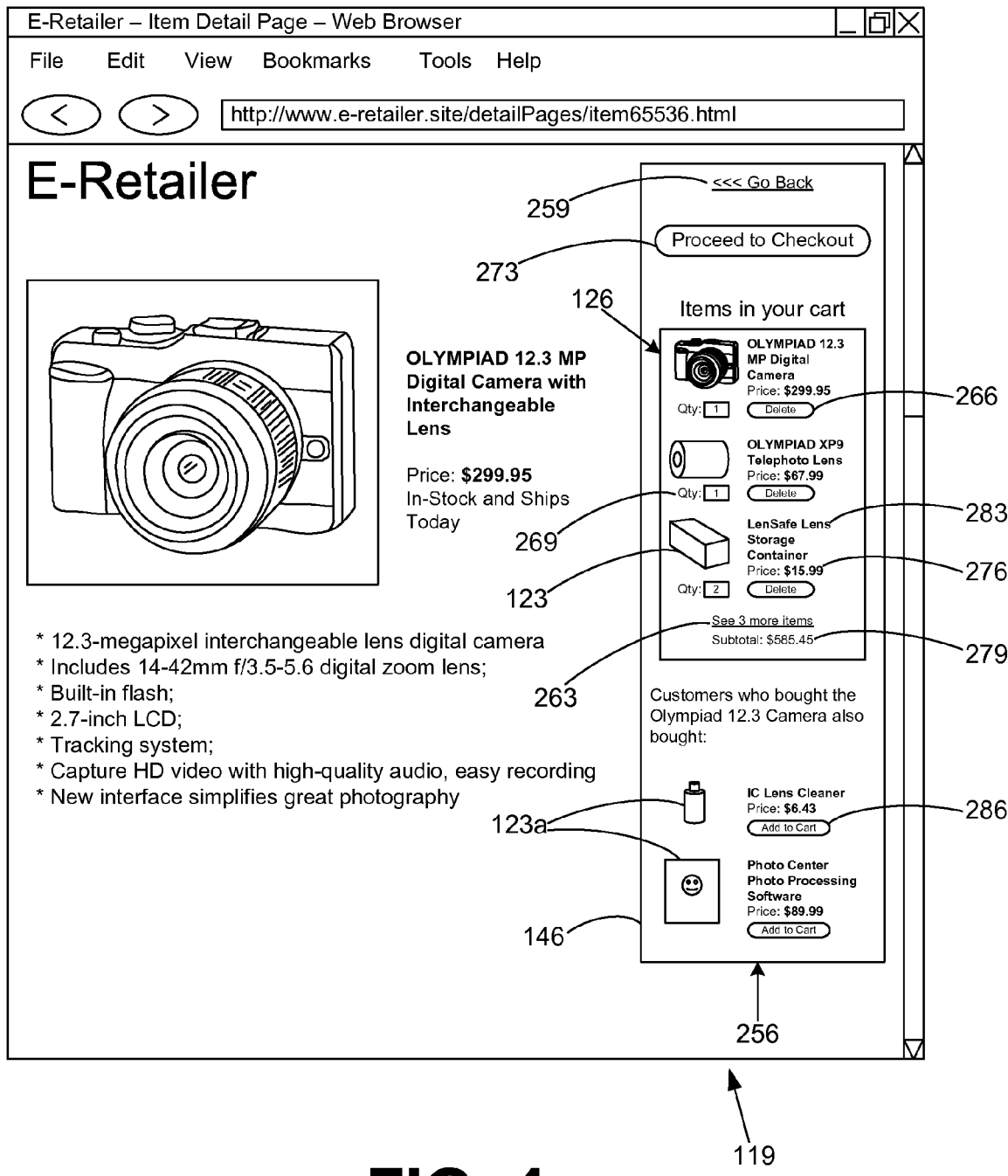

Referring then to FIG. 4, shown is still another depiction of the network page 119 as rendered by the browser 153 (FIG. 1) executed in the client 106 (FIG. 1) according to another embodiment of the present disclosure. Depicted in the region 146 of the network page 119 is a second view 256 that results after the transition 253 (FIG. 3) described above.

The second view 256 includes an undo view component 259. The undo view component 259 may be manipulated to facilitate a reverse transition of the region 146 back to the first view 203 (FIG. 2). To this end, upon manipulation of the undo view component 259, the region transition process 143 (FIG. 1) is configured to perform a further transition 253 in the region 146 to revert back to the first view 203.

Further, the second view 256 in the region 146 depicts an example of the user list 126 that comprises, for example, a virtual shopping cart. Various items 123 are depicted as being included in the virtual shopping cart. By virtue of a manipulation of the component 206 (FIG. 2), the digital camera depicted is included in the virtual shopping cart as a part of the user list 126.

In addition, in one embodiment only a portion of the user list 126 is depicted. Associated with the user list 126 in the second view 256 is a link 263 that facilitates sending a request from the client 106 to the electronic commerce application 116 (FIG. 1) in the computing device 103 (FIG. 1) for a subsequent network page 119 that depicts a complete rendering of the items 123 included in the user list 126. Alternatively, it may be that the complete user list 126 is depicted in the second view 256, where the link 263 is omitted.

In another embodiment, removal components 266 are associated with each of the items 123 depicted in the user list 126. Each removal component 266 is associated with one or more items 123 depicted in the user list 126 and facilitate a removal of the respective item(s) 123 from the user list 126. In the example shown, the removal component 266 comprises a delete button that, when manipulated, deletes the respective item 123 from the virtual shopping cart comprising the user list 126.

Further, associated with each item 123 is a quantity component 269 that facilitates modifying a quantity associated with each of the items 123 in the user list 126. To this end, users may specify how many of each one of the items 123 they seek to include in the user list 126. For example, the quantity component 269 may indicate the quantities of items 123 that users wish to purchase in the case that the user list 126 comprises a virtual shopping cart. In another embodiment, the removal component 266 and/or the quantity component 269 may be omitted from display in association with the items 123 in the user list 126 depicted in the region 146.

Still further, the region 146 includes a "proceed to checkout" component 273 that may be manipulated to proceed to a checkout process in the situation where the user list 126 comprises a virtual shopping cart in order to effect the purchase of the items 123 included in the virtual shopping cart as can be appreciated. Upon manipulation of the proceed to checkout component 273, a request is sent to the electronic commerce application 116 implemented on the computing device 103 for a subsequent network page 119 that implements the checkout process as can be appreciated.

In addition, other information may be depicted in association with each of the items 123 in the user list 126 in the region 146 such as, for example, item prices 276, subtotals 279, product descriptions 283, and other information as can be appreciated. Since, in one embodiment, the user list 126 is restricted to a portion of the region 146, it may be the case that a limited amount of information is displayed with respect to each of the items 123 as shown.

In addition, the region 146 may be employed to present an offering for one or more additional items 123a to add to the user list 126 in the case that the user list 126 comprises, for example, a virtual shopping cart. Associated with each of the additional items 123a is an item addition component 286 that may be manipulated to cause the respective item 123a to be added to the user list 126 that comprises, for example, the virtual shopping cart. Thus, the second view 256 may include item addition components 286 in the second view 256 that facilitates adding additional items 123a to the user list 126.

In one embodiment, each of the additional items 123a is related in some way to a respective one or more of the items 123 in the user list 126 depicted in the region 146. For example, additional items 123a may be related to items 123 in the user list 126 by virtue of the fact that they are compatible with such items 123. For example, there may be a cable depicted as one of the additional items 123a that is useful to connect a respective one of the items 123 to a power source or other device as can be appreciated. Alternatively, the additional items 123 may be related to the items 123 as indicated by the order data 133 (FIG. 1) or the page view data 136 (FIG. 1). For example, where many users have ordered a given additional item 123a when they have also purchased a given item 123, then a relationship may be determined. Such a relationship may be determined when a threshold of buyers who purchase an item 123 also purchased a certain additional item 123a. For example, it may be determined that if more than a predefined percentage of the buyers of an item 123 also buy an additional item 123a, then such additional item 123a may be deemed related to the item 123. Such a percentage may be, for example, thirty percent of buyers who purchase the item 123 also purchase an additional item 123a, or some other percentage may be employed.

Also, it may be the case that page view data 136 is consulted to determine whether the other additional item 123a is related to a given item 123. For example, if it is determined that a threshold number of individuals who view an item 123 through the electronic commerce application 116 also view the additional item 123a, then a relationship may be assumed. In addition, the additional items 123a may be related to the respective items 123 in some other manner. When a user manipulates the item add component 286, the respective additional item 123 is added to the user list 126 as mentioned above.

As an alternative, the additional items 123 may be related to a subset of items 123 in the user list 126 where multiple items 123 have been saved in the user list 126 for an extended period of time. For example, the additional items 123 may be related to only the items 123 that have been most recently added to the user list 126. For example, an item 123 may be deemed to have been recently added to the user list 126 if it was added to the user list 126 within a predefined period of time in the past. For example, an item 123 may be considered "recently added" if it was added to the user list 126 within the past hour, day, week, or other specified time period depending upon the circumstances. Alternatively, an item 123 may be considered recently added if it was added within the current session with the electronic commerce application 116 based upon a current active login.

Figure 5:
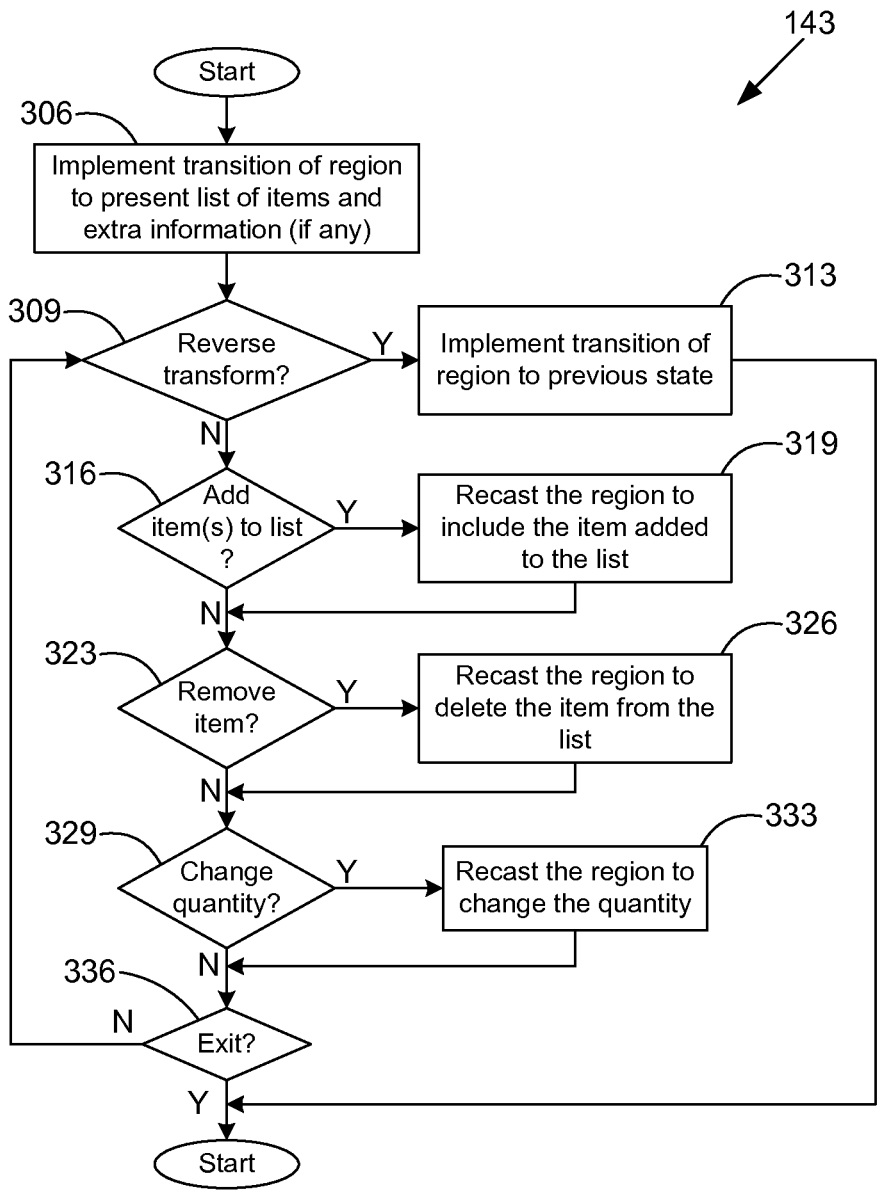
FIG. 5 is a flowchart illustrating one example of functionality implemented as a portion, for example, of an electronic commerce application executed in a computing device in the networked environment of FIG. 1 according to various embodiments of the present disclosure.

Referring next to FIG. 5, shown is a flowchart that provides one example of the operation of at least a portion of the region transition process 143 according to various embodiments. It is understood that the flowchart of FIG. 5 provides merely an example of the many different types of functional arrangements that may be employed to implement the operation of the region transition process 143 as described herein. As an alternative, the flowchart of FIG. 5 may be viewed as depicting an example method implemented in the client 106 (FIG. 1) according to one or more embodiments. As depicted in FIG. 5, various functionality of the region transition process 143 is provided in association with the transition 253 (FIG. 3) and other functionality. In one embodiment, the various functions depicted may actually be implemented by separate modules or functional entities included within the network page 119 (FIG. 1).

The region transition process 143 is executed upon an occurrence of a predefined event such as, for example, a manipulation of the list view component 213 or other event. In one example, the region transition process 143 comprises an executable portion of the network page 119 that is implemented when a user clicks on a link or other component comprising the list view component 213.

Assuming that the region transition process 143 is executed, then in box 306 the region transition process 143 implements the transition 253 of the region 146 to present item lists 126 (FIG. 1) and other information and components as depicted with respect to the second view 256 (FIG. 4) described above.

In one embodiment, the content comprising the second view 256 may have been encoded or otherwise included in the network page 119 before it was initially sent to the client. Alternatively, the region transition process 143 may cause a request to be sent to the electronic commerce application 116 (FIG. 1) for the content comprising the second view 256. In response to the request, the electronic commerce application 116 generates the second view 256 and sends the same to the client 106.

Once the second view 256 is ultimately displayed in the region 146 after the transition 253, the region transition process 143 progresses to box 309. Note that the transition 253 is described as occurring between the first and second views 203 (FIG. 2), 256. It is understood that the first and second views 203, 256 are examples of the various views that may be depicted in the region 146. To this end, the transition 253 may occur between any two of many different views that may be depicted in the region 146. Also, in one embodiment, in box 306, the region transition process 143 is configured to decide to implement the transition 253 upon a manipulation of the add component 206 (FIG. 2) or the list view component 213 (FIG. 2) as mentioned above, or based at least in part upon some other action or event, etc.

In box 309, it is determined whether a reverse transition is to occur such that the user has manipulated an undo view component 259 (FIG. 4) or some other undo component 206 such as an undo button on a browser 153 (FIG. 1) or other application as can be appreciated. If so, then the region transition process 143 proceeds to box 313 to implement a reverse transition of the region 146 to the previous state which may comprise, for example, the first view 203 as described above. Thereafter, the region transition process 143 ends as shown.

However, assuming that no reverse transition is to occur in box 309, then in box 316, it is determined by the region transition process 143 whether to add an additional item 123a (FIG. 4) to the user list 126. If so, then the region transition process 143 progresses to box 319. Otherwise, the region transition process 143 progresses to box 323. In box 319, the region transition process 143 recasts the region 146 such that the additional item 123a is added to the user list 126. Also, a message is sent to the electronic commerce application 116 (FIG. 1) that the respective additional item 123a was added to the respective user list 126 so that such information may be updated and any other appropriate action taken. Thereafter, the region transition process 143 progresses to box 323.

In box 323, it is determined whether an item 123 (FIG. 4) is to be removed from the user list 126. This may be determined based upon whether the user has manipulated a removal component 266 (FIG. 4) associated with a respective item 123 or by some other appropriate action as can be appreciated. Assuming an item is to be removed, the region transition process 143 proceeds to box 326. Otherwise, the region transition process 143 progresses to box 329.

In box 326, the region 146 is recast to show the deletion of the item 123 from the user list 126. In addition, a message is transmitted to the electronic commerce application 116 indicating that the respective item 123 has been removed from the respective user list 126 so that the electronic commerce application 116 may update the user list 126 in the data store 113 (FIG. 1). Thereafter, the region transition process 143 progresses to box 329.

In box 329, the region transition process 143 determines whether a quantity has been changed in association with one of the items 123. If so, then the region transition process 143 progresses to box 333 to indicate the change in quantity. To this end, the quantity may change in the respective quantity component 269 (FIG. 4) as described above. In addition, a message is transmitted to the electronic commerce application 116 indicating that the respective quantity was changed to allow the electronic commerce application 116 to update the user list 126 in the data store 113. Thereafter, the region transition process 143 proceeds to box 336 as shown. If no quantity is to be changed in box 329, then the region transition process 143 also proceeds to box 336.

In box 336, the region transition process 143 determines whether to exit due to action taken by a user or other events. For example, a user may decide to enter a checkout process in order to purchase items 123 depicted in a given user list 126, where the user list 126 comprises a virtual shopping cart. Such action may cause the browser 153 to request subsequent network pages 119 to implement a checkout process, etc. In addition, there may be other reasons why the region transition process 143 would be exited. Assuming that the region transition process 143 is to be exited as determined in box 336, then the region transition process 143 ends as shown. Otherwise, the region transition process 143 reverts back to box 309.

In addition, there may be other functionality associated with the region transition process 143 not described above that is associated with the respective components of the first and second views 203, 256 in the region 146 as can be appreciated. Also, the flowchart of FIG. 5 may be viewed as depicting the functionality of multiple, independent functions that are performed based upon various actions taken by a user as opposed to strictly following the flow described above.

Figure 6:
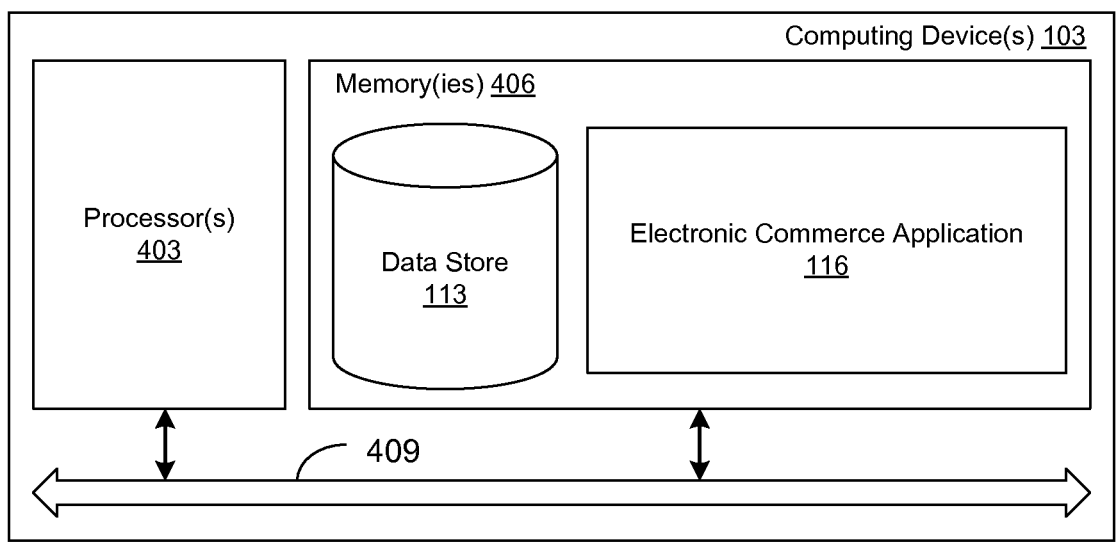
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce application 116, and potentially other applications. Also stored in the memory 406 may be the data store 113 in which are stored the various data described above. In addition, an operating system may be stored in the memory 406 and executable by the processor 403.

Also, the client 106 (FIG. 1) may include a processor circuit having a processor and a memory, where the browser 153 (FIG. 1) is executed by the processor in order to execute the rendering of the network page 119 (FIG. 1) and cause the execution of the region transition process 143 (FIG. 1) and other functionality.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce application 116, the region transition process 143, other executable portions of the network page 119, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the region transition process 143 included in the network page 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, various blocks shown in FIG. 5 may be omitted in other embodiments. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 116, the region transition process 143, other executable portions of the network page 119, or other functionality that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   a network page encoded for rendering in a client, the network page including a region in the network page in which one of a plurality of views are rendered, wherein a first one of the views depicts at least one mechanism to add a depicted item in the network page to a virtual shopping cart, and a second one of the views depicts at least a portion of a plurality of items in the virtual shopping cart;
   a region transition process associated with the network page, the region transition process being configured to implement a transition between the rendering of two of the views in the region by implementing an animated flipping of the region;
   code associated with the network page that creates a saved state of the at least two views upon initiating the region transition process by initiating a call to a server;

code associated with the network page that performs a reverse transition of the region upon a manipulation of an undo component, the reverse transition reverting the region to the saved state;

code associated with the network page that performs the region transition process in response to a deletion of one of the items from the virtual shopping cart upon a manipulation of a removal component associated with the one of the items depicted in the second one of the views; and code associated with the network page that performs the region transition process in response to the adding of an additional item depicted in the second one of the views to the virtual shopping cart upon manipulation of an additional component associated with the additional item depicted in the second one of the views, the additional item being related to at least one of the items included in the virtual shopping cart.

2. A system, comprising:

at least one computing device; and an application executable in the at least one computing device, the application comprising:

logic that encodes a network page for rendering in a client, the network page including a region, the region being configured for the rendering of at least two views and the network page being encoded to depict a transition between the at least two views, the transition comprising an animated flipping of the region, wherein a first one of the views depicts at least one mechanism to add a depicted item in the network page to a list, and a second one of the views depicts at least a portion of the list;

logic that creates a saved state of the at least one of the two views upon initiating the transition upon a receipt of a request received from the client;

logic that performs a reverse transition of the region upon manipulation of an undo component, wherein the reverse transition reverts the region to the saved state;

logic that performs the region transition process in response to the adding of the depicted item in the first one of the views to the list upon manipulation of the at least one mechanism to add the depicted item in the network page to the list; and logic that transmits the network page to the client.

3. The system of claim 2, wherein the application includes a content of the at least two views into the network page.

4. The system of claim 2, wherein the application is configured to include a first content of the first one of the views into the network page, and the application is further configured to transmit a second content of the second one of the views to the client upon receipt of a request for the second content from the client after the sending of the network page to the client.

5. The system of claim 2, wherein the at least one mechanism initiates the transition between the at least two views.

6. The system of claim 2, wherein the list further comprises a virtual shopping cart.

7. The system of claim 2, wherein the list further comprises an order for a plurality of items.

8. The system of claim 2, wherein the list further comprises a wish list.

9. The system of claim 2, wherein the list sets forth a plurality of items, and the second one of the views depicts a removal component associated with at least one of the plurality of items depicted, the removal component configured to initiate a removal of the at least one of the plurality of items from the list.

10. The system of claim 6, wherein the second one of the views further comprises:

an offering of at least one additional item to add to the virtual shopping cart; and at least one additional component associated with the at least one additional item, the at least one additional component initiating an addition of the at least one additional item to the virtual shopping cart.

11. The system of claim 10, wherein the at least one additional item is related to at least one item in the list.

12. The system of claim 10, wherein the at least one additional item is related to at least one of a plurality of items added to the list within a predefined period of time.

13. The system of claim 10, wherein the at least one additional item is related to at least one item added to the list within a current session.

14. The system of claim 2, wherein the second one of the views further comprises an additional component that is configured to initiate the reverse transition of the region back to the first one of the views.

15. The system of claim 2, wherein the first one of the views further comprises an additional component that initiates the transition of the region from the first one of the views to the second one of the views.

16. The system of claim 2, wherein the second one of the views further comprises a link that is configured to initiate sending an additional request to the application for a subsequent network page that depicts a complete rendering of a plurality of items included in the list.

17. The system of claim 2, wherein the list is at least one of: a virtual shopping cart, a shopping list, a purchase list, a gift registry, and a wish list.

18. The system of claim 2, wherein the second one of the views includes at least one component for modifying a quantity associated with a corresponding at least one of a plurality of items in the list.

19. The system of claim 2, wherein the second one of the views includes a subtotal price associated with the list.

20. A method, comprising the steps of:

encoding a network page in at least one computing device for rendering in a client by:

including a region in the network page in which one of a plurality of views is rendered, wherein a first one of the views depicts at least one item in the network page, and a second one of the views depicts at least a portion of a list, and associating a region transition process with the network page, the region transition process being configured to transition between the rendering of at least two of the views in the region, the transition comprising an animated flipping of the region;

saving a state of the at least two views upon performing the region transition process;

including an undo component in the network page that performs a reverse transition upon manipulation of the undo component, wherein the reverse transition reverts the region to the saved state;

receiving a manipulation of an adding component to add the at least one item to the list and in response automatically performing the region transition process; and transmitting the network page to the client.

21. The method of claim 20, further comprising the steps of:

generating the second one of the views upon receiving a request from the client for the second one of the views; and sending the second one of the views to the client to be rendered in the region after the transition.

22. The method of claim 20, wherein the list further comprises a virtual shopping cart.

23. The method of claim 20, wherein the list further comprises a wish list.

24. A method, comprising the steps of:

rendering a network page received from a server in a client device by:

rendering a region in the network page in which one of a plurality of views are rendered, wherein a first one of the views depicts at least one mechanism to add a depicted item in the network page to a list, and a second one of the views depicts at least a portion of the list;

executing a region transition process associated with the network page in the client to recast the region by performing a transition between the rendering of the first one of the views to the rendering of a second one of the views in the region by conducting an animated flipping of the region in response to a manipulation of a component of the first one of the views;

saving a state of at least one of the views upon performing the region transition process;

providing an undo component in the network page that is configured to perform a reverse transition upon manipulation of the undo component, wherein the reverse transition reverts the region to the saved state; and receiving a manipulation of an adding component to add the depicted item to the list and in response automatically performing the region transition process.

25. The method of claim 24, further comprising the step of requesting the second one of the views from a server over a network in association with the transition.

26. The method of claim 24, further comprising the step of manipulating a component depicted in the second one of the views to remove one of the items from the list.

27. The method of claim 24, wherein the list further comprises a virtual shopping cart.

28. The method of claim 24, wherein the list further comprises a wish list.

* * * * *